2,910,364

PACKAGED AND STERILIZED MILK-LIKE PRODUCT AND PROCESS

Rex H. Powley, Seattle, Wash., assignor to Skinner Corporation, Seattle, Wash., a corporation of Washington No Drawing. Continuation of abandoned application Serial No. 488,133, February 14, 1955. This application October 20, 1958, Serial No. 768,082

19 Claims. (Cl. 99—125)

This invention concerns a new article of manufacture, which in countries distant from coconut plantations would normally take the form of a hermetically sealed and completely sterilized package of a "coconut milk," which is a liquid extract derived ordinarily from desiccated coconut, usable as a beverage or in substantially all other ways in which fresh dairy milk, which it resembles, is usable, and concerns also the process of preserving such a liquid extract from desiccated coconut over an indefinite period of time, in the absence of refrigeration, without material change in its flavor, color, or consistency, so that it is available for use immediately upon opening the package. The invention concerns also such a package modified, according to preferred practice, by the addition of a neutralizer, to the extent such is needed; of a stabilizer, if needed to maintain solids (including certain added solids, and flavors, as discussed hereinafter) in suspension and to prevent stratification, which stabilizer may also include an emulsifier; and in particular, by the addition of a protein supplement which is compatible with the liquid extract and which will adjust its protein content to a value more nearly comparable with dairy milk, and which is not affected by, nor capable of causing changes in the liquid extract as a result of the subsequent sterilizing operation. The invention further concerns the process whereby a liquid extract of the character described, modified to the extent necessary or desirable, can be sterilized in the package without causing changes in its flavor, color, or consistency, nor, in particular, as a result of the presence of the modifying agents or ingredients.

It has been stated that the liquid extract is derived from desiccated coconut. Desiccated coconut is the white endosperm from specially selected good coconuts. Such selected fresh coconuts are opened and the endosperm, with the thin brown coating shaved off the kernel, is grated or shredded and dried in a careful, sanitary manner. The desiccated coconut contains in the maximum degree the nutrient elements of the coconut, namely, the fat, the proteins, and the sugars, yet has a low percentage of free fatty acids. Being dried, it will keep for long periods of time, thus being distinguished from shelled fresh coconut endosperm, which ferments quickly and undergoes enzymatic changes. The sweet taste and smell of desiccated coconut, its freedom from fermentation, and its low free fatty acid content, distinguish it from copra, which although a dried form of the endosperm, is a foul smelling and tasting product, putrid and unfit for human consumption because, among other things, it contains a relatively high content of free fatty acids. The principal use of copra is as a source of oils for soaps, etc., whereas desiccated coconut is used by confectioners, bakers, etc.

The distinctions above are explained in the co-pending application of C. D. Dolman, Serial No. 721,760, filed March 17, 1958. The manner of extraction of the "coconut milk" or "cream" from the desiccated coconut is also explained therein, and in general this is accomplished by permitting the desiccated coconut to absorb substantially enough water to saturate it, and by then pressing or by a suitable mechanical operation separating out the coconut milk in the form of an aqueous milk emulsion of fat, proteins, sugars, and the characteristic flavor ketones or the like. The coconut milk thus extracted is usually high in percentage of fat, and can be used much as dairy cream is used, and for other uses it is customarily diluted, and in a more dilute form suited for beverage use. Reference is made to the Dolman specification for further details of the source product, the process of extraction, and the basic end products.

Being initially somewhat deficient in protein value, the protein value of the coconut milk is even further lowered by dilution and it will not wholly and by itself take the place of dairy milk. Coconut milk as disclosed in the Dolman application is not sterilized or even pasteurized, but by the present invention it is possible to increase the protein content of such coconut milk by addition of a protein supplement. If it were necessary to pasteurize coconut milk, or certainly, if it were necessary to sterilize it, the proteins commonly available for such addition, in the presence of the sugars and other carbohydrates such as starches, would tend to produce a non-reversible pudding-like consistency. It has not heretofore been known how to sterilize coconut milk, as a necessary step in packaging it for indefinite non-refrigerated preservation, without change in its color, flavor, and consistency, one or all. The Dolman product has been used, therefore, without long delay following extraction, primarily in making frozen desserts comparable to ice cream.

The Dolman product has not been found suitable for beverage use except when fresh, and it will keep fresh for a number of days, at most, when pasteurized. Since the starting product for the Dolman process, desiccated coconut, can be shipped readily and stored for long periods, this inability to package and ship the Dolman product in the absence of refrigeration is a drawback only in that it necessitates its production at frequent intervals near each point of use, as needed. It has not been practicable, however, to package the product and to distribute it widely from a few production plants, for use at an indefinitely later time, for reasons already given.

According to the present invention, however, there is taught for the first time hom to package such product, even with added protein as is desirable, to sterilize it, and to ship it without refrigeration or special handling for use at any time in the indefinite future after production, when its use may be desired. When opened its color, flavor, and consistency compare closely with the original, freshly extracted liquid. It follows that the present product has the future advantage that it can be produced at a few centrally located plants, where the packaging and sterilizing machinery may be kept economically fully occupied, rather than requiring the production of the liquid extract more or less intermittently at many scattered points of use, in smaller quantities.

The specific liquid product presently available in accordance with this invention is comparable to the well known chocolate milk, or chocolate dairy drink, which is whole milk or fat-free milk with added sugar and cocoa for flavoring. It is not the intention to limit the present invention to such a "chocolate milk," for it is of broad application to all milk or cream products, and the "chocolate milk" hereinafter described will be used merely to illustrate one of many possible uses, and the various products which can be made from the packaged product of this invention, then, will be illustrated by the following examples.

A "chocolate milk" packaged according to the present process contained components in the following proportions, by weight:

Example 1

| | Percent |
|---|---|
| Coconut fat from 15% fat "coconut cream" | 2.0 |
| Solids-not-fat (protein, pentosans, sugars and minerals from the coconut) | .5 to 1.0 |
| Cocoa, finely ground (200 mesh or finer preferred) | 2.0 |
| Carbohydrates (sucrose, dextrose, etc.) | 10.0 to 11.0 |
| Stabilizer and emulsifier | .1 |
| Water | q.s. |
| | 100 |

A batch of one hundred pounds was made up from the following actual ingredients in the proportions given below:

Example 2

| | Lbs. |
|---|---|
| 15% fat "coconut cream" | 13⅓ |
| Finely ground cocoa (as above) | 2 |
| Sucrose and dextrose sugars | 10 to 11 |
| Stabilizer and emulsifier | 1/10 |
| Water (q.s.) | 74+ |
| | 100 |

If the product were to be a milk beverage, without the cocoa flavoring, the same might contain an additional amount of fat in place of the cocoa, so that such a plain beverage milk product might for example incorporate:

Example 3

| | Percent |
|---|---|
| Fat from 15% fat "coconut cream" | 4.0 |
| Solids-not-fat (as in Example 1) | 0.5 to 1.0 |
| Carbohydrates (sucrose, dextrose, etc.) | 10.0 to 11.0 |
| Stabilizer and emulsifier | 0.1 |
| Soluble soya protein (as hereinafter explained), sufficient to elevate the total protein to | 1.5 to 2.0 |
| Water | q.s. |
| | 100 |

In the preparation of the chocolate milk of the first example, the "coconut cream" and water were heated to a temperature of 140° F., and the mixed dry ingredients (cocoa, carbohydrates, stabilizer and emulsifier) were added. The whole was agitated vigorously and the temperature raised to 170° to 175° F., then it was homogenized at 2500 to 3000 pounds pressure per square inch. The homogenized liquid, at 165° F. or higher, was then filled into cans (ten ounce cans being the size used) and the filled cans hermetically sealed and autoclaved fifteen to twenty minutes at 240° to 245° F. to sterilize the contents. The time and/or temperature will vary according to the size of can used, and the consequent bulk of liquid to be sterilized.

It is highly desirable in beverages, and particularly if the beverage is to replace unavailable dairy milk, to add a protein supplement, for the "coconut milk" of the Dolman process, in fact that extracted from fresh or desiccated coconuts by any process, is deficient in protein. On the other hand, the use as a protein supplement of any animal protein introduces the difficulty of sterilizing, such as is found in the sterilization of dairy milk products, namely, there is a change of taste, flavor, consistency and color from the use of heat, particularly when temperatures sufficient to effect sterilization are employed. However, most of the vegetable proteins that are of low cost (and low cost is essential for successful commercial operations) have associated with them so many starches and similar carbohydrates that they, too, in common with animal proteins, are unsuitable, for here again, the use of sterilizing temperatures will tend to break down associated carbohydrates and so to produce a product similar to a starch pudding. In other words, there is a non-reversible change in the physical consistency and chemical nature of the protein supplement which affects the whole product to which it has been added.

There is available, however, a soluble soya protein from which the carbohydrates can, in large measure, be removed. It is identified commercially as extracted soya flour or grits. It is this type of protein supplement and this specific protein supplement which is the one most suitable for use. It should be used in an amount which, with the protein from the coconut, will raise the total protein content to at least two percent in the dilution employed. Fortunately, this soluble soya protein is widely available, and particularly is it available in those regions where the coconut is available, and its cost is very low. It is, therefore, admirably suited for use with the "coconut milk" of the Dolman invention, and its use produces no appreciable change in the Dolman product in color or in consistency, and if there is a change in taste or flavor, it is primarily in the direction of enriching the taste; 1.5% of protein by weight is desirable.

The maintenance of the pH of the liquid extract at or very close to 7.0, that is, neutral, is very desirable in order that it may keep over an indefinite period in the containers. This is especially necessary if protein supplement is added to the extract. The maintenance of the pH at neutrality assists in preventing settling out, or stratification, of the liquid extract. The addition of a stabilizer, to lessen the tendency towards settling out, or the homogenization of the liquid extract, to the same end, lessen the need for close control of the pH, yet the maintenance of pH at or close to 7.0 is still highly desirable, whether or not a stabilizer is used, and whether or not the liquid extract is homogenized before sealing it within the containers. Suitable neutralizers are available, and can be added, in the examples above, to the extent needed to maintain neutrality. Under ideal conditions, with selected starting materials and in centralized factories properly operated and controlled, the Dolman process can be operated without the need for an added neutralizer, yet ideal conditions do not always obtain, and whenever the pH of the "coconut milk" departs appreciably from neutrality, for instance as a result of modification of the liquid extract, whether by reason of the addition of a stabilizer, or of a protein supplement, or from any other cause, the addition of a neutralizer to restore the pH to a value of approximately 7.0 will insure that the liquid extract when subsequently removed from the container after an indefinite period of time, will be found substantially unchanged in flavor, in color, in consistency, and in nutritive value. Unless the neutrality of the "coconut milk" is thus maintained, and in particular if a stabilizer is used to avoid settling out, and the liquid extract is then subjected to sterilizing temperatures as indicated above, it has been found that the liquid extract will undergo a change in consistency in the receptacle, with passage of time. It is likely to become thicker, more like a starch pudding than a beverage, and to stratify. Its color, too, changes, from a light, milk-like color (if no cocoa flavoring has been added) to a deeper, custard-like color. Its taste or flavor is likely to change, along the same general lines. The freedom from change in these respects, as noted above, is characteristic of my article of manufacture, and of my process of producing the same.

The examples chosen (numbers 1 and 2) have employed cocoa as the flavoring agent. This is an indisoluble powder, held in dispersion, and better held by the addition of a stabilizer. Other flavors can be used instead of the cocoa, but the cocoa flavored liquid resembles closely the widely available chocolate milk drink. This and all other products of this invention keep indefinitely in the cans. The equivalent of two years of shelf life has produced no noticeable change in flavor, consistency or color. The pleasant coconut flavor persists, although so masked in the "chocolate milk" by the chocolate flavor that only a few persons are aware of it, and even fewer can identify it. Upon opening a can, the "chocolate milk" is ready to drink (slight agitation redisperses any settled cocoa) and is as eagerly consumed as the conventional chocolate milk drink heretofore available.

It is not essential that the fat content be reduced to two percent in the one example or four percent in the other. This is done primarily when the product is to be used as a beverage. As a constituent for incorporation into other products, it may be preferred to maintain the fat content higher. Moreover, a high fat content product, according to the present invention, would be or could be a reasonably condensed product, capable of being increased in bulk merely by addition of water, and thus might save shipping costs, so that it is not intended to imply that the fat content need be appreciably reduced. A higher fat content liquid may require an additional amount of emulsifier.

Without flavoring or added sugars, but with the added protein, the packaged "coconut milk" is a highly nutritious and pleasant beverage and usable also in recipes in substantially the same manner as whole cow's milk. It is instantly ready for use at any time upon opening the can or other container. After opening, the "coconut milk" must be kept refrigerated and free from contamination, but it can be supplied in containers of a size for prompt consumption, hence need never spoil. Even so, it will keep several days under refrigeration.

It has been mentioned above that the protein, the soluble soya extract, originates in the same general areas as produce the coconuts from which the "coconut milk" is extracted. It is, therefore, entirely feasible to locate processing plants in such areas and to ship thence the packaged product, and even to use fully ripe fresh coconuts instead of desiccated coconut as the starting product, or alternatively to distribute the product from processing plants located distantly from the producing areas, for the raw materials will stand shipment and are not high in cost, even at great distances from the points of origination.

The use of a suitable container is, of course, essential. the use of ordinary tins or cans as containers for the liquid "coconut milk" is convenient, since automatic and sanitary machinery for filling, sealing and processing them is available, and the cans are readily autoclaved at elevated temperature without danger of breakage. If it is found practicable to package the liquid "coconut milk" in glass or in other styles of containers and to sterilize the package, it is intended to include all such containers within the broadest aspects of this invention.

It should be noted here that sterilized flavored milk products generally have been no more acceptable heretofore as beverages than unflavored sterilized milk products. The sterilization so alters their flavor and palatability, flavored or unflavored, that they will not be readily accepted by most consumers. The added flavor cannot mask the flavor which is characteristic of sterilization of dairy milk. For instance, the physiochemical changes associated with the heat processing of dairy milk are heat coagulation, caramelization to some degree, and the consequent development of body, flavor and color. Brown color and cooked flavor are closely associated one with the other in heated dairy milk products, and both increase as the time and temperature of cooking increase. Color (browning) is generally attributed to caramelization of the lactose in the presence of milk protein. The flavor of heated milk is associated with the liberation of sulfides and the formation of sulfahydryl groups. It has been proposed to sterilize dairy milk by the use of high temperature for a short time. Thus processed, the product immediately after processing resembles pasteurized milk, but during storage develops a thickening of the body and an oxidized flavor. These arise from physiochemical instability, which appears to be the result of a gradual irreversible denaturation or break-down of the casein.

Moreover, few persons like boiled milk or any milk product which has been boiled. In addition, the housewife dislikes to boil milk, for it froths up and runs over and tends greatly to stick to the cooking pan. The present product can be brought to and kept at a rolling boil, and does not tend appreciably to stick to the pan. Nor does the boiling, at least within reason, affect its taste. As a matter of fact, the "chocolate milk" of the example given above, when boiled, resembles cocoa, and is preferred to cocoa, as ordinarily prepared, by those who have tasted it.

Here, then, in the present product for the first time is a flavored (or unflavored if preferred or desired) beverage similar to chocolate (or regular) milk in taste, consistency and color, and capable of keeping indefinitely until opened, and then fully as long under refrigeration as the corresponding dairy product; a product substantially as nutritious with the added protein as the dairy product, and because the "coconut milk" and the soluble soya extract can be produced quite inexpensively, as low or lower in cost than the dairy product even in dairy regions.

The addition of stabilizers has been mentioned. These are desirable in order to prevent the sedimentation of the "coconut milk" product. The use of an emulsifier is also desirable for the reason that coconut fat tends to solidify at ordinary temperatures and the emulsifier will counteract this tendency and maintain the uniformity of the liquid product. The use of a neutralizer to maintain the pH of the liquid in the vicinity of neutral has been mentioned above, and is not necessarily required, although preferred. The pH of the liquid contents does not change with time, and the liquid product upon opening—whether or not a neutralizer has been added initially—retains its original neutral pH.

I claim as my invention:

1. A new article of manufacture comprising a hermetically sealed, completely sterilized package of aqueous liquid extract of desiccated coconut, containing nonfat and fat substances of desiccated coconut, and having a pH in the vicinity of 7.0.

2. A new article of manufacture comprising a hermetically sealed completely sterilized package of aqueous liquid extract of desiccated coconut, containing nonfat and fat substances of desiccated coconut, and containing also a neutralizer establishing the pH of the liquid at approximately 7.0.

3. A new article of manufacture comprising a hermetically sealed completely sterilized package of homogenized aqueous liquid extract of desiccated coconut, containing nonfat and fat substances of desiccated coconut.

4. A new article of manufacture comprising a hermetically sealed complete sterilized package of homogenized aqueous liquid extract of desiccated coconut, containing nonfat and fat substances of desiccated coconut, and containing also a neutralizer establishing the pH of the liquid at approximately 7.0.

5. A new article of manufacture comprising a hermetically sealed completely sterilized package of aqueous liquid extract of desiccated coconut, containing nonfat and fat substances of desiccated coconut, and containing also a stabilizer to maintain in suspension water-insoluble solids in the liquid.

6. A new article of manufacture comprising a hermetically sealed completely sterilized package of homogeneous aqueous liquid extract of desiccated coconut, containing nonfat and fat substances of desiccated coconut, and containing also a dispersion of finely ground cocoa and a stabilizer to maintain the cocoa in suspension.

7. A new article of manufacture comprising a hermetically sealed completely sterilized package of homogenized aqueous liquid extract of desiccated coconut, containing nonfat and fat substances of desiccated coconut, and containing also a neutralizer establishing the pH of the liquid at approximately 7.0, and a stabilizer to maintain in suspension water-insoluble solids in the liquid.

8. A new article of manufacture comprising a hermetically sealed completely sterilized package of aqueous liquid extract of desiccated coconut, containing fat and nonfat substances, including protein of desiccated coconut, and supplemental protein sufficient to boost the total protein content of the packaged liquid extract up to at least 1.5% by weight.

9. A new article of manufacture comprising a hermetically sealed completely sterilized package of aqueous liquid extract of desiccated coconut, containing nonfat and fat substances of desiccated coconut, and containing also a vegetable protein in quantity sufficient to boost the total protein content of the packaged liquid extract up to at least 1.5% by weight.

10. A new article of manufacture comprising a hermetically sealed completely sterilized package of homogeneous aqueous liquid extract of desiccated coconut, containing nonfat and fat substances of desiccated coconut, and containing also a vegetable protein of minimum carbohydrate content, in quantity sufficient to boost the total protein content of the packaged liquid extract to a minimum in the range of 1.5% to 2.0% by weight.

11. A new article of manufacture comprising a hermetically sealed completely sterilized package of homogenized aqueous liquid extract of desiccated coconut, containing nonfat and fat substances of desiccated coconut, and containing also a compatible and sterilizable vegetable protein in quantity sufficient to boost the total protein content of the liquid extract up to at least 1.5% by weight, and a neutralizer establishing the pH of the liquid at approximately 7.0.

12. A new article of manufacture comprising a hermetically sealed completely sterilized package of homogenized aqueous liquid extract of desiccated coconut, containing nonfat and fat substances of desiccated coconut, and containing also a compatible and sterilizable vegetable protein in quantity sufficient to boost the total protein content of the liquid extract up to at least 1.5% by weight, and a neutralizer establishing the pH of the liquid at approximately 7.0, and a stabilizer to maintain in suspension water-insoluble solids in the liquid.

13. A new article of manufacture comprising a hermetically sealed completely sterilized package of liquid extract of desiccated coconut, the approximate analysis of which is:

| | Percent |
|---|---|
| Fat from 15% fat "coconut cream" | 4.0 |
| Solids-not-fat (protein, pentosans, sugars and minerals from the coconut) | 0.5 to 1.0 |
| Carbohydrates (sucrose, dextrose) | 10.0 to 11.0 |
| Stabilizer | 0.1 |
| Water | q.s. |
| | 100.0 |

14. The process of preparing and preserving an aqueous extract of desiccated coconut, which comprises adding water to desiccated coconut, and mechanically extracting the resultant aqueous extract of fat and nonfat substances from the desiccated coconut; thereafter filling a sealable receptacle with the extract at a pH of substantially 7.0, hermetically sealing the filled receptacle, and subjecting the receptacle and contents to a sterilizing temperature until the contents are completely sterilized.

15. The process of preserving an aqueous liquid extract of desiccated coconut, which process includes adjusting the pH, to the extent necessary, to a value of approximately 7.0, introducing the liquid extract within a receptacle, hermetically sealing the filled receptacle, and subjecting the same to a sterilizing temperature for a time sufficient to sterilize completely the contents thereof within the sealed receptacle.

16. The process of preserving a homogeneous aqueous liquid extract of desiccated coconut, which comprises adding a neutralizer to the liquid extract to adjust its pH substantially to 7.0, homogenizing the liquid extract, introducing the neutralized, homogenized extract into a receptacle, hermetically sealing the receptacle, and subjecting the sealed receptacle to a sterilizing temperature for a time sufficient to sterilize completely the contents thereof.

17. The process of preserving a homogeneous aqueous liquid extract of desiccated coconut, which comprises adding a stabilizer to the liquid extract to effect suspension of water-insoluble solids in the liquid, introducing the stabilized extract into a receptacle, hermetically sealing the filled receptacle, and subjecting the sealed receptacle to a sterilizing temperature for a time sufficient to sterilize completely the contents thereof.

18. The process of preparing an aqueous extract of desiccated coconut, which comprises extracting an aqueous extract from desiccated coconut, adding a protein supplement to the extract, introducing such modified aqueous extract, at a pH of substantially 7.0, within a sealed receptacle, hermetically sealing the filled receptacle, and subjecting the receptacle to a sterilizing temperature for a time sufficient to sterilize completely the contents.

19. The process of preserving a homogeneous aqueous liquid extract of desiccated coconut, which comprises adding a neutralizer to the extent necessary to adjust the pH of the liquid extract substantially to 7.0, adding a stabilizer to effect suspension of water-insoluble solids in the liquid, adding a protein supplement in an amount to boost the total protein content up to at least 1.5% by weight, introducing the so-modified liquid extract into a receptacle, hermetically sealing the filled receptacle, and subjecting the sealed receptacle to a sterilizing temperature for a time sufficient to sterilize completely the contents thereof in place.

References Cited in the file of this patent

UNITED STATES PATENTS

| 145,722 | Classon | Dec. 23, 1873 |
| 1,104,376 | Monahan et al. | July 21, 1914 |
| 1,267,449 | Piperno | May 28, 1918 |
| 1,348,689 | Baker | Aug. 3, 1920 |
| 1,374,879 | Cookson | Apr. 12, 1921 |